United States Patent
Araki et al.

(10) Patent No.: US 10,452,858 B2
(45) Date of Patent: Oct. 22, 2019

(54) ENCRYPTION KEY MANAGEMENT FOR FILE SYSTEM

(71) Applicant: International Business Machines Corporation, Armonk, NY (US)

(72) Inventors: Hiroshi Araki, Yokohama (JP); Shah Mohammad R. Islam, Tucson, AZ (US); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 15/086,651

(22) Filed: Mar. 31, 2016

(65) Prior Publication Data

US 2017/0286709 A1 Oct. 5, 2017

(51) Int. Cl.
　*G06F 21/62*　　(2013.01)
　*H04L 9/08*　　(2006.01)
　*H04L 9/14*　　(2006.01)

(52) U.S. Cl.
　CPC .......... *G06F 21/6218* (2013.01); *H04L 9/083* (2013.01); *H04L 9/0894* (2013.01); *H04L 9/14* (2013.01); *G06F 2221/2107* (2013.01)

(58) Field of Classification Search
　CPC .............. G06F 21/6218; G06F 21/10; G06F 2221/2107; G06F 21/6209; H04L 63/0428; H04L 63/083; H04L 9/0894; H04L 9/14
　See application file for complete search history.

(56) References Cited

U.S. PATENT DOCUMENTS

| | | | |
|---|---|---|---|
| 7,930,756 B1* | 4/2011 | Crocker | G06F 21/6209 705/57 |
| 9,432,192 B1* | 8/2016 | Pogde | H04L 9/0836 |
| 9,906,952 B2* | 2/2018 | Warren | H04W 12/04 |
| 2005/0010763 A1* | 1/2005 | Matsui | H04L 63/0464 713/165 |
| 2005/0132204 A1* | 6/2005 | Gouguenheim | G06F 21/10 713/185 |
| 2006/0179309 A1* | 8/2006 | Cross | G06F 21/602 713/168 |
| 2008/0175391 A1* | 7/2008 | Finkelstein | H04L 9/0822 380/278 |

(Continued)

OTHER PUBLICATIONS

Arkko et al., "Improved Extensible Authentication Protocol Method for 3rd Generation Authentication and Key Agreement (EAP-AKA') (RFC5448)", An IP.com Prior Art Database Technical Disclosure, Original Publication Date: May 1, 2009, IP.com No. 000183484, IP.com Electronic Publication: May 23, 2009, Copyright (c) 2009, 59 pages.

(Continued)

*Primary Examiner* — Farid Homayounmehr
*Assistant Examiner* — Sanchit K Sarker
(74) *Attorney, Agent, or Firm* — Monchai Chuaychoo (57) ABSTRACT

In an approach to encryption key management, a computing device, responsive to a key storage condition, stores, in a cache memory, a first e/d key. The computing device receives a request to read a first file. The computing device, responsive to the request, accesses the first file, with the accessing of the first file including: accessing, from the cache memory, the first e/d key, decrypting the first file using the first e/d key and a second e/d key, and accessing the decrypted version of the first file.

15 Claims, 4 Drawing Sheets

(56) References Cited

U.S. PATENT DOCUMENTS

| | | | |
|---|---|---|---|
| 2010/0070778 A1 | 3/2010 | Murray | |
| 2011/0010298 A1* | 1/2011 | Robert | G06Q 10/06 705/59 |
| 2011/0093717 A1* | 4/2011 | Iwao | H04L 9/12 713/179 |
| 2012/0054444 A1* | 3/2012 | Wang | G06F 16/27 711/133 |
| 2012/0057696 A1* | 3/2012 | Chew | H04L 9/14 380/30 |
| 2012/0203972 A1* | 8/2012 | Benjamin | G06F 9/4488 711/133 |
| 2012/0321087 A1* | 12/2012 | Fleischman | H04L 9/3213 380/279 |
| 2013/0198521 A1* | 8/2013 | Wu | G06F 21/6209 713/175 |
| 2014/0068254 A1* | 3/2014 | Scharf | G06F 21/6209 713/165 |
| 2014/0161251 A1* | 6/2014 | Yoshida | H04L 9/0825 380/44 |
| 2014/0281571 A1 | 9/2014 | Federspiel | |
| 2015/0160998 A1* | 6/2015 | Anvin | G06F 12/14 714/807 |
| 2015/0161409 A1 | 6/2015 | Szebeni et al. | |
| 2015/0229476 A1* | 8/2015 | Lumb | G06F 21/62 713/193 |
| 2017/0206164 A1* | 7/2017 | Choi | G06F 12/0871 |
| 2017/0286709 A1* | 10/2017 | Araki | G06F 21/6218 |
| 2018/0034787 A1* | 2/2018 | Kamaraju | H04L 63/0464 |
| 2018/0351749 A1* | 12/2018 | Chen | H04L 9/3247 |
| 2019/0012213 A1* | 1/2019 | Leggette | H04L 63/0428 |

OTHER PUBLICATIONS

Dwoskin et al., "Hardware-rooted Trust for Secure Key Management and Transient Trust", CCS'07, Oct. 29-Nov. 2, 2007, Alexandria, Virginia, USA. Copyright 2007 ACM 978-1-59593-703-2/07/0010, pp. 389-400.

* cited by examiner

| root directory in the file system | level 1 in the file tree | level 2 in the file tree | level 3 in the file tree |
|---|---|---|---|
| dir1 (dir 1 key) | subdir1 (subdir1 key) | subsubdir1 (subsubdir1 key) | file1 (file1 key) |
| | | | file2 (file2 key) |
| | | subsubdir2 (subsubdir2 key) | file3 (file3 key) |
| | | | file4 (file4 key) |
| | subdir2 (subdir2 key) | subsubdir3 (subsubdir3 key) | file5 (file5 key) |
| | | | file6 (file6 key) |
| | | subsubdir4 (subsubdir4 key) | file7 (file7 key) |
| | | | file8 (file8 key) |
| dir2 (dir 2 key) | | | |

FIG. 4

ENCRYPTION KEY MANAGEMENT FOR FILE SYSTEM

BACKGROUND

The present invention relates generally to the field of data security, and more particularly to cryptographic protection of data in a file system.

Security/data protection is typically an element of enterprise storage systems. Customers typically want data in the storage media to be encrypted for data protection. Some commercially-available enterprise storage systems that store files in a hierarchically organized set of directories, subdirectories, subsubdirectories, etc.: (i) randomly generate an encryption key per file and per directory; (ii) encrypt the file data using the encryption key corresponding to the file and encryptions keys corresponding to any directories in a hierarchical path between the file and a root node of the hierarchical file system; (iii) save the key in the extended attributes of the file or directories (as applicable); (iv) encrypt the file key by a master key, which is maintained outside of the storage system; (v) perform encryption in a manner that is transparent to upper applications that access the file via the file system, such as text editors, office suite applications, and NFS/CIFS servers that receive data from clients across a network; and/or (vi) perform encryption/decryption of the key and the file data in the file system layer.

Customers can change an encryption key in an enterprise storage system (e.g., periodically and/or for security reasons). The encryption key change operation typically requires access of: (i) a master encryption key; (ii) the file or directory encryption key that the customer wishes to change; and (iii) encryption keys for any directory in a hierarchical path between the file or directory whose corresponding encryption key the customer wishes to change and the root node of the file system.

SUMMARY

According to an aspect of the present invention, there is a method, computer program product and/or system for use with an encrypted file system including a first encrypted file directory, with the first file directory including a first file and a second file, with the first file directory having a corresponding first encryption/decryption (e/d) key, the first file having a corresponding second e/d key, and the second file having a corresponding third e/d key, so that decryption of the first file requires at least use of both the first and second e/d keys, and decryption of the second file requires at least use of both the first and third e/d keys. A computing device, responsive to a key storage condition, stores, in a cache memory, the first e/d key. The computing device receives a request to read the first file. The computing device, responsive to the request, accesses the first file, with the accessing of the first file including: accessing, from the cache memory, the first e/d key, decrypting the first file using the first and second e/d keys, and accessing the decrypted version of the first file.

DETAILED DESCRIPTION

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
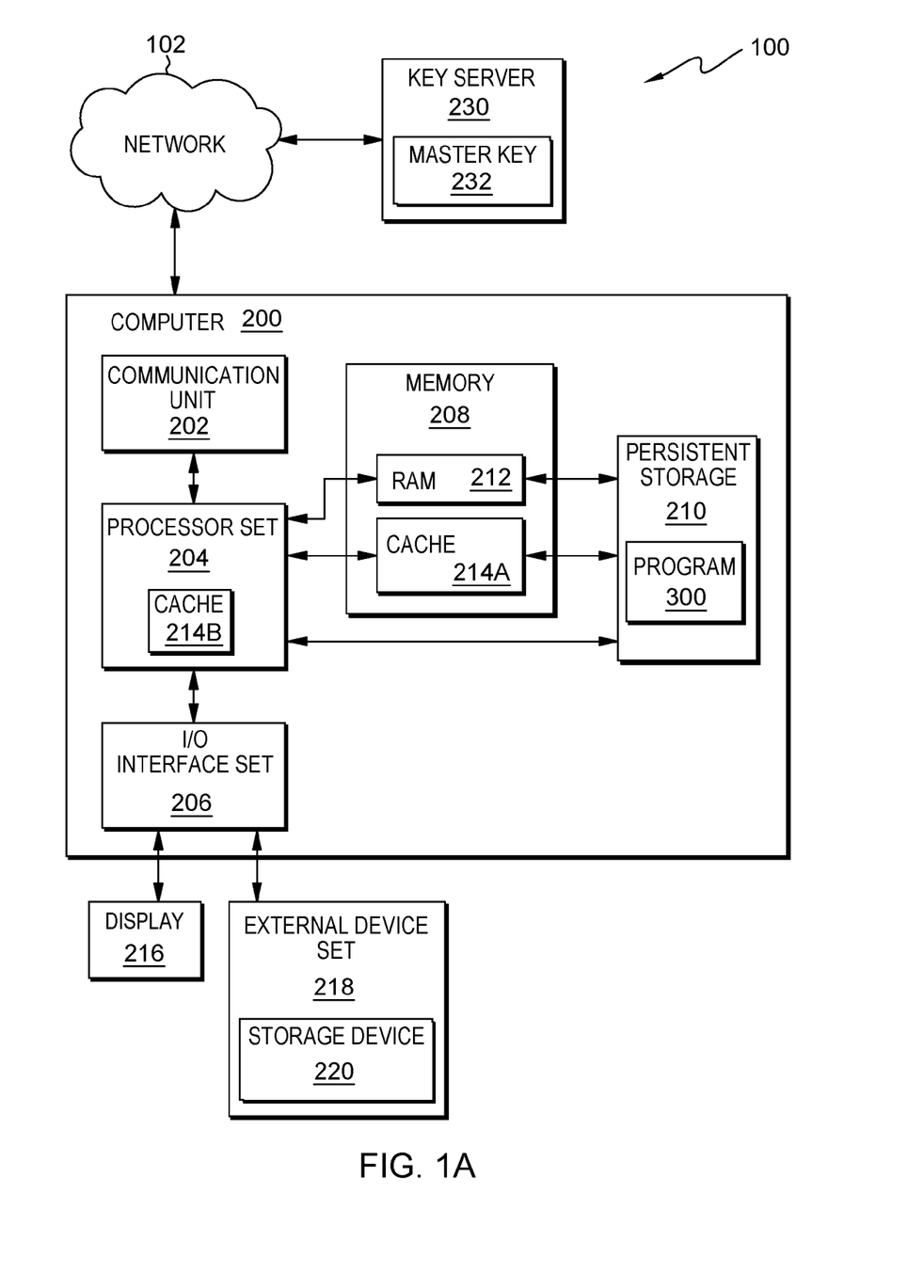
FIGS. 1A-B are a block diagram views of an exemplary computing environment and an exemplary file system, respectively, in accordance with an embodiment of the present invention.

An embodiment of a possible hardware and software environment for software and/or methods according to the present invention will now be described in detail with reference to the Figures. FIG. 1A is a functional block diagram illustrating various portions of computing environment 100, including: computer 200; communication unit 202; processor set 204; input/output (I/O) interface set 206; memory 208 with random access memory (RAM) 212 and cache 214A; persistent storage 210; cache 214B; display 216; external device set 218 with storage device 220; key server 230; master key 232; and program 300.

Computer 200 may be a laptop computer, tablet computer, netbook computer, personal computer (PC), a desktop computer, a personal digital assistant (PDA), a smart phone, or any programmable electronic device capable of communicating with the client sub-systems via network 102. Program 300 is a collection of machine readable instructions and/or data that is used to create, manage and control certain software functions that will be discussed in detail, below, in the Example Embodiment sub-section of this Detailed Description section.

Computer 200 is capable of communicating with key server 230 and other devices (not shown) via network 102. Network 102 can be, for example, a local area network (LAN), a wide area network (WAN) such as the Internet, or a combination of the two, and can include wired, wireless, or fiber optic connections. In general, network 102 can be any combination of connections and protocols that will support communications between server and client sub-systems.

Computer 200 is shown as a block diagram with many double arrows. These double arrows (no separate reference numerals) represent a communications fabric, which provides communications between various components of computer 200. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device set 218 may be able to supply, some or all, memory for computer 200; and/or (ii) devices external to computer 200 may be able to provide memory for computer 200.

Cache 214A (an "off-chip" cache) is a fast memory that enhances the performance of processor set 204 by holding recently accessed data, and data near accessed data, from memory 208. In an embodiment, processor set 204 can include cache 214B (an "on-chip cache") for faster access.

Program 300 is stored in persistent storage 210 for access and/or execution by one or more of the respective processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to computer 200. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with computer 200. For example, I/O interface set 206 provides a connection to external device set 218. External device set 218 will typically include devices such as a keyboard, keypad, a touch screen, and/or some other suitable input device. External device set 218 can also include portable computer-readable storage media (such as storage device 220) such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage 210 via I/O interface set 206. I/O interface set 206 also connects in data communication with display 216.

Display 216 provides a mechanism to display data to a user and may be, for example, a computer monitor or a smart phone display screen.

Key server 230 can store master key 232 outside of computer 200. Computer 200 can obtain master key 232 from key server 230 and store master key 232 in memory 208. Computer 200 can periodically access key server 230 to revalidate the stored master key 232.

Additional features of master key 232 are described in detail in sub-sections (ii) and (iii).

Figure 1B:
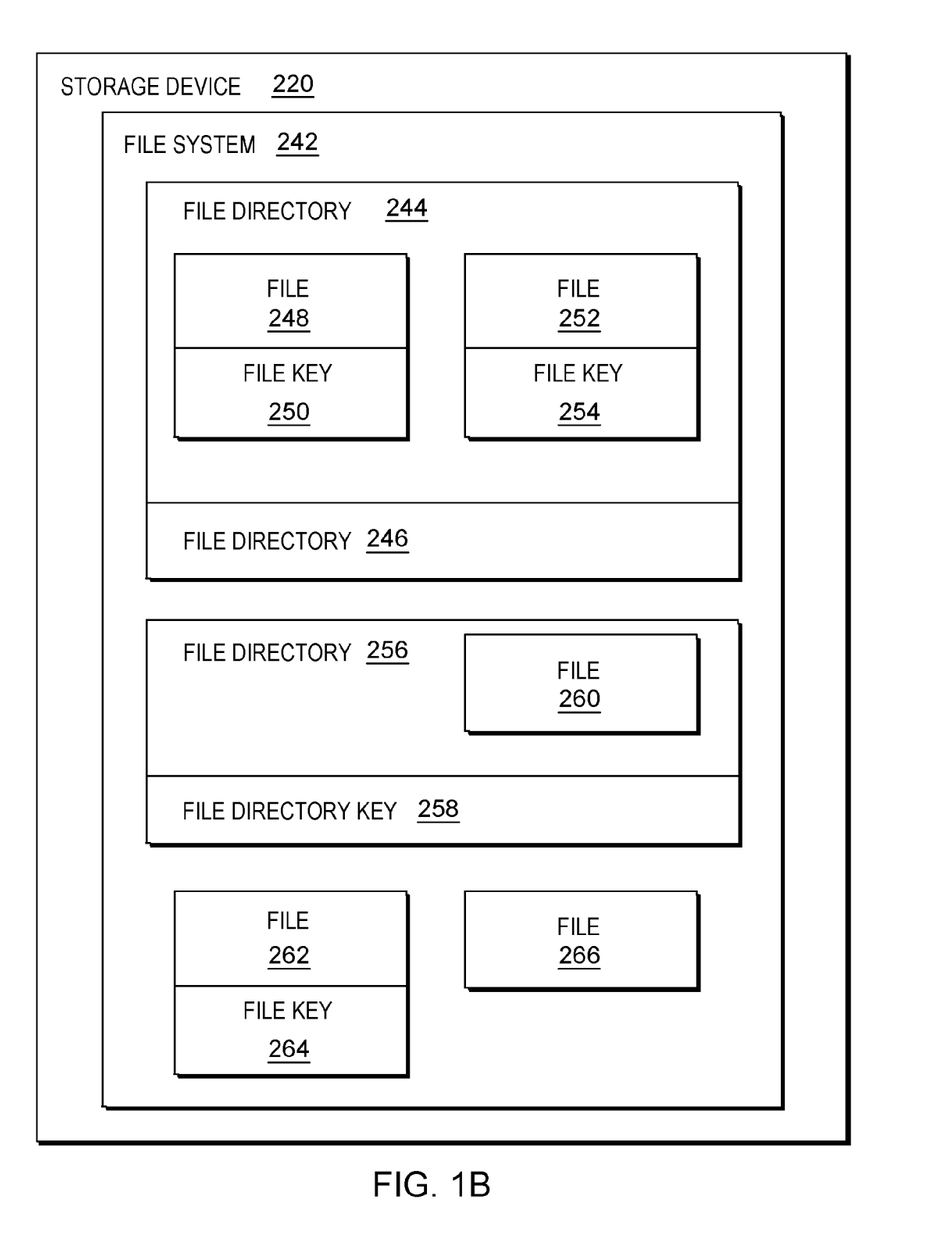

FIG. 1B depicts an exemplary file system 242 within storage device 220, in accordance with an embodiment of the present invention. File system 242 includes file directory 244 with corresponding file directory key 246, file 248 with corresponding file key 250, and file 252 with corresponding file key 254; file directory 256 with corresponding file directory key 258, and file 206; file 262 with corresponding file key 264; and file 266.

In the depicted embodiment: (i) file system 242 is not hierarchical (i.e., there are no subdirectories, subsubdirectories, etc.); (ii) not all files are stored in directories (see, e.g., file 262, file 266); and (iii) not all files and/or directories are encrypted (see, e.g., file 260, file 266).

In other embodiments, one or more of the following can be true of file system 242: (i) file system 242 is hierarchical (as represented herein, in FIG. 4); (ii) all files are stored in directories (this is typical of many hierarchical file systems); and/or (iii) all files and/or directories are encrypted.

Additional features of file system 242 are described in detail in sub-section (iii).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
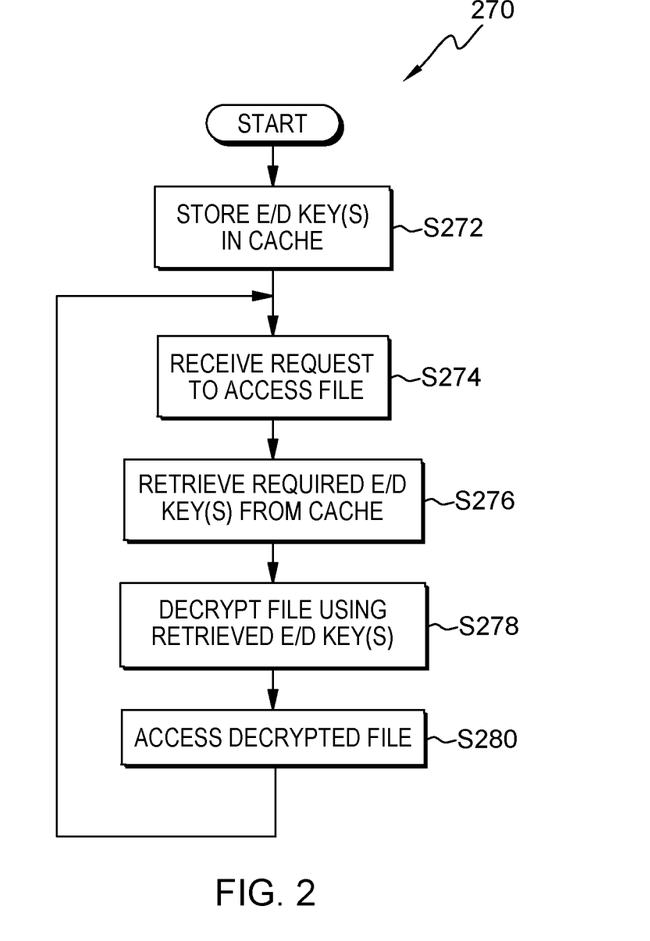
FIG. 2 is a flowchart showing a method performed by the system of FIGS. 1A and 1B, in accordance with an embodiment of the present invention.
Figure 3:
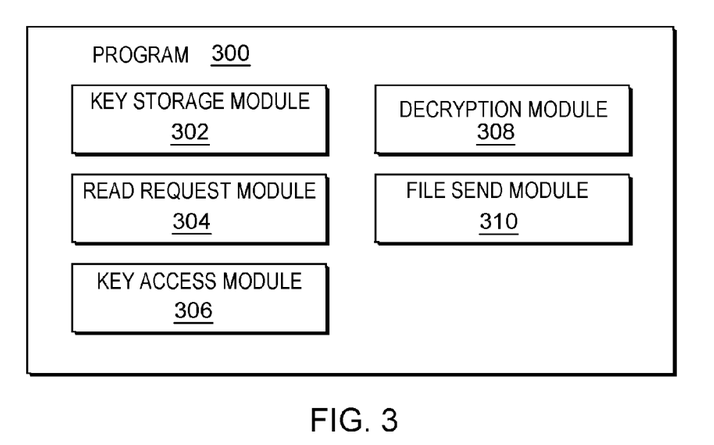
FIG. 3 is a block diagram showing a machine logic (for example, software) portion of the exemplary computing environment, in accordance with an embodiment of the present invention.

FIG. 2 shows flowchart 270, depicting an encryption key management method, in accordance with an embodiment of the present invention. FIG. 3 shows program 300 for performing at least some of the method operations of flowchart 270. This method and associated software will now be discussed, over the course of the following paragraphs, with extensive reference to FIG. 2 (for the method operation blocks) and FIG. 3 (for the software blocks).

Processing begins at operation S272, where key storage module ("mod") 302 stores one or more encryption/decryption ("e/d") keys (e.g., file directory key 246, file key 250) for file system 242 in cache memory (e.g., cache 214A, cache 214B) responsive to a "key storage condition." In an embodiment, the key storage condition can include decryption of file 248, such that at least some e/d keys are currently stored in volatile memory of computer 200, as described in detail in sub-section (iii).

Alternatively, in some embodiments, the key storage condition can include one or more of the following: (i) the system is scheduled for a key change that is coming soon; (ii) analytics predict that there will soon be a need to decrypt many directories and/or files to serve client requests; (iii) user input requests cache storage; and/or (v) it is detected that memory space has been freed in cache 214A and/or cache 214B such that there is sufficient room to store e/d keys.

At operation S272, all e/d keys 246, 250, 254, 258, 264 are stored in cache memory. For example: (i) decrypted versions of all e/d keys are stored in cache 214B; and (ii) encrypted versions of all e/d keys (re-encrypted by master key 232, as described in sub-section (iii)) are stored in cache 214A.

Alternatively, in some embodiments, fewer than all e/d keys may be cached, for example if it is not practical to cache all e/d keys file-system-wide because of insufficient cache space. Sub-section (iii) describes an example wherein: (i) access of a file is a key storage condition; and (ii) only the e/d keys needed to access the file are cached.

In some embodiments, there may be no master key and, consequently, only decrypted versions of the e/d keys exist.

In some embodiments, only encrypted versions of the e/d keys are cached (for example, for security reasons).

In this embodiment, symmetric key encryption is used for the encrypted files and/or directories. Alternatively, any type of encryption (now known or to be developed in the future) can be used.

Processing proceeds to operation S274, where read request module ("mod") 304 receives a request, e.g., from an upper application (not shown) on computer 200, to receive a decrypted version of file 248. For example, the requesting application can be a program that is loaded on memory 208 of computer 200 with its instructions fetched to the CPU of computer 200. Mod 304 determines, by conventional methods for making authorization determinations, that the requester is authorized to receive file 248.

Processing proceeds to operation S276, where key access module ("mod") 306: (i) determines which e/d keys are required to access file 248; and (ii) retrieves the required e/d key(s) from the cache. For example, mod 306 retrieves a decrypted version of file key 250 from on-chip cache 214B because it is the only version of the only e/d key needed to decrypt file 248. Alternatively, for example if the e/d key data in cache 214B has been overwritten (e.g., because the on-chip cache memory was required by other operations of computer 200), then the encrypted version of file key 250 could be: (i) retrieved from cache 214A; and (ii) decrypted by master key 232 in order to generate a decrypted version of file key 250.

In some embodiments, multiple e/d keys may be required to perform an operation. Accordingly, embodiments of the present invention can determine: (i) which e/d keys are needed to perform a requested operation; and (ii) determine whether the required keys exist in a cache.

While the presently-discussed embodiment stores all e/d keys in a cache at all times, this may not always be practical due to space limitations in the cache and ongoing computer operations that require cache use (e.g., cache use for purposes other than encryption/decryption). Therefore, in some embodiments: (i) there may not be any e/d keys in the cache at a given time; (ii) the identity of the e/d keys in the cache may change over time; and/or (iii) the key storage conditions may be designed to ensure that only the most appropriate, or most likely to be needed, e/d keys are in the cache at a given time.

Processing proceeds to operation S278, where decryption module ("mod") 308 decrypts file 248 using conventional decryption methods for decrypting a file using e/d key(s). In this embodiment, the decryption machine logic (i.e., hardware and/or software) is part of program 300. Alternatively, mod 308 can be: (i) built into processor set 204, e.g., as a dedicated hardware component integrated into the CPU chip; and/or (ii) located elsewhere in computer 200, e.g., as a separate co-processor.

Operation S278 yields a decrypted version of file 248 (not separately depicted). Depending on the embodiment: (i) only one e/d key (e.g., only file key 250) is needed; (ii) multiple e/d keys (e.g., file directory key 246, file key 250) are needed (e.g., a large hierarchical file system can require e/d keys from multiple layers of hierarchically organized folders in a path between the requested file and the root node); and/or (iii) the e/d keys are used in a predefined order, as discussed herein in sub-section (iii).

Processing proceeds to operation S280, where file send module ("mod") 310 sends the decrypted version of file 248 to the authorized requester.

Processing can loop back to operation S254 responsive to a next file request.

The method represented by flowchart 270 was described in terms of a request for a decrypted file. Alternatively, or additionally, according to various embodiments of the present invention, cached keys can be used for other purposes, which may be further discussed in sub-section (iii).

III. Further Comments and/or Embodiments

Some embodiments of the present invention may recognize one, or more, the following facts, potential problems and/or potential areas for improvement with respect to the current state of the art: (i) with current designs, changing an encryption key for a file system in an enterprise storage system can be difficult; (ii) if the master key has been changed, that typically requires re-encryption of all file keys; and/or (iii) in some conventional systems, the following steps may be required with respect to each file key pursuant to changing a master key for a file system: (a) read the file key from extended attributes, (b) decrypt the file key by the old master key, (c) re-encrypt the file key by the new master key, and (d) write the file key to the extended attributes.

Some embodiments of the present invention may include one, or more, of the following features, characteristics and/or advantages: (i) an enterprise file system suitable for an enterprise data storage system where customer data is rapidly growing and where a single enterprise may have billions of stored files; (ii) an encryption feature for a file system that does not take a very long time and use a lot of resources (CPU and disk access) to change an encryption key; (iii) enhancement of the key management of a file system with an encryption feature such that a master key can be changed in a short time; (iv) introduction of a directory key in addition to the conventional master key and file key; (v) management of keys in a hierarchy, which is aligned with a file tree corresponding to the file system associated with the keys; (vi) reduction of the number of keys encrypted by the master key, such that the master key change can be completed in a short time; and/or (vii) addition of a new routine to the caching algorithm of the key to minimize performance impact.

Some embodiments of the present invention may include one, or more, of the following features, characteristics and/or advantages: (i) embodiments may be implemented as a new addition to an existing enterprise file system that already includes an encryption feature; (ii) each directory key is responsible for encrypting keys of files and sub-directories that exist in that directory only (not recursive); (iii) the master key is responsible for encrypting the root directory keys and the keys for the files on the root directory;

and/or (iv) when the master key is changed, only the root directory keys and the keys for the files on the root directory need to be changed, and the rest of the keys are not affected.

Figure 4:
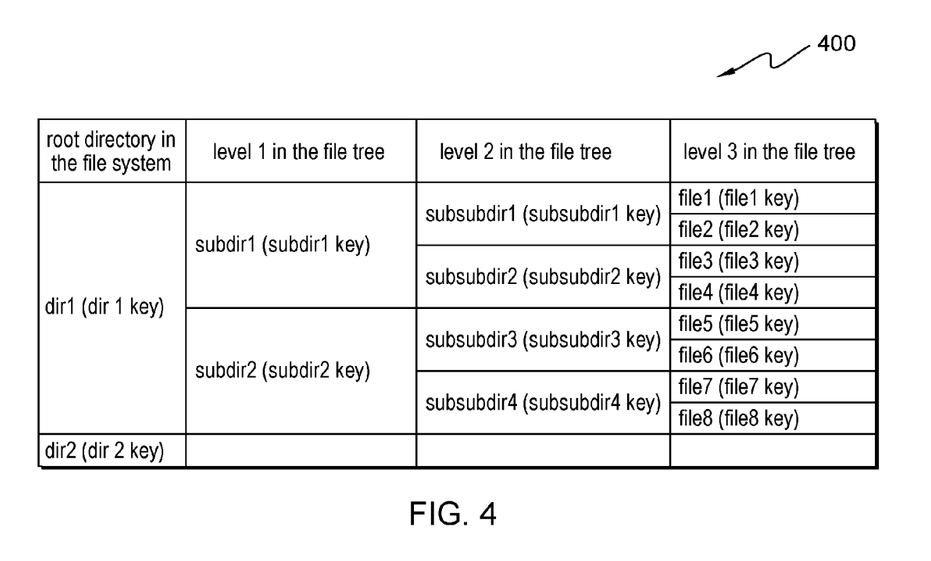
FIG. 4 shows a sample of a file tree and corresponding directory and file keys, in accordance with an embodiment of the present invention.

For example, table 400 of FIG. 4 shows, in tabular form, a sample of a file tree and corresponding directory and file keys. In the exemplary embodiment of FIG. 4: (i) the master key is used to encrypt/decrypt the underlying dirX keys; (ii) the dirX keys are used to encrypt/decrypt the underlying subdirX keys; (iii) the subdirX keys are used to encrypt/decrypt underlying subsubdirX keys; and (iv) the subsubdirX keys are used to encrypt/decrypt the underlying file keys.

Some embodiments of the present invention may include one, or more, of the following features, characteristics and/or advantages: (i) the root directory has a small number of directories; (ii) at least for a large file system, it is unlikely that a customer would put all of its files flat under the root directory; and/or (iii) following from the previous item on this list, the number of keys encrypted by the master key is drastically decreased and the master key change can be completed in a short time.

Some embodiments of the present invention may include one, or more, of the following features, characteristics and/or advantages: (i) using the above-described key management structure, the master key can be used directly for encrypting only the root directory and root file keys, thus allowing changing the master key to be completed in a reasonable time; (ii) this key management structure can have a performance impact on every file I/O because the file system needs to start from the master key and decrypt all upper directory keys of a file; (iii) as the file path becomes deep with many sub-directories, the number of decryption processes increases and the performance impact becomes severe; and/or (iv) in order to minimize the I/O throughput impact without sacrificing security, a new caching algorithm (cache routine) is introduced for the keys.

The cache routine will now be discussed. To avoid performance impact, once a directory key or a file key has been decrypted, the new cache routine encrypts the directory key or file key by the master key and saves it in the cache. For example, in the file tree sample of table 400 of FIG. 4, when /dir1/subdir/subsubdir1/file1 is read for the first time, the following keys are read and decrypted (except for the master key): master key, dir1 key, subdir1 key, subsubdir1 key, and file1 key. The new cache routine re-encrypts the directory keys and file key using the master key and saves them in the cache. More specifically, in this embodiment, the following operations are performed (not necessarily in the following order): (i) dir1 key is encrypted by the master key, (ii) subdir1 key is encrypted by the master key, (iii) subsubdir1 key is encrypted by the master key, and (iv) file1 key is encrypted by the master key.

Some embodiments of the present invention may include one, or more, of the following features, characteristics and/or advantages: (i) typically, a file system caches inode blocks for directories and/or files, but a re-encrypted key can be saved to over-write the key in the extended attributes, requiring no extra cache space for the key; (ii) if a subsequent file (/dir1/subdir1/subsubdir1/file2) is read, the file system can find the subsubdir1 key (re-encrypted by the master key) in the cache, decrypt it by the master key, and use it to decrypt the file2 key and read file2 data, thus the overhead of having keys in multiple layers can be minimized without sacrificing the level of security typical of conventional technology; (iv) the file1 key is not used for decryption of file2; and/or (v) the file1 key is be needed when flushing the cache data to disks (encryption) or re-reading the data from disks (decryption) after the cache data has been de-staged.

Some embodiments of the present invention may include one, or more, of the following features, characteristics and/or advantages: (i) storing decrypted key data, as opposed to encrypted key data, in the cache would increase speed but decrease security, for example if the decrypted key data is exposed by core/memory dump or by memory crawl malware; (ii) storing key data in storage media (disks) rather than the cache would have a severe performance penalty; (iii) in light of the foregoing, embodiments of the present invention store key data in the cache encrypted; (iv) because the key management structure requires multiple keys (keys from all upper directories) for a file and the decryption routine needs to run for every key to arrive at the final file key used to decrypt the file data, the performance penalty could be severe depending on the number of upper directories; (v) instead of simply saving keys in the cache encrypted as when stored in the disks, embodiments of the present invention re-encrypt the keys in a less strict way, such that they are easier to use again; and/or (vi) embodiments of the present invention re-encrypt all keys using only the master key such that, when file data needs to be read again, the required steps are: (a) obtain the file key from the cache, (b) decrypt the file key using the master key, and (c) decrypt the file data using the decrypted file key.

Some embodiments of the present invention may include one, or more, of the following features, characteristics and/or advantages: (i) when the master key has been changed, all key data in the cache must be cleared; (ii) key re-encryption is required when files or directories are moved within the file tree; and/or (iii) re-encryption pursuant to moving of files or directories is only needed from the point of the moved file or directory (the recursive process is not required).

Some embodiments of the present invention may include one, or more, of the following features, characteristics and/or advantages: (i) a read cache is segmented with an inode (metadata) area and a data area; (ii) the inode (metadata) of a file is not typically large; (iii) a lot of inode information is typically staged to the cache memory and stays there for a relatively long time; (iv) the cache can have a dedicated area for a key; and/or (v) a lot of key data can be staged to the cache memory and stay there.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method for use with an encrypted file system, the method comprising:
   encrypting a file system wherein the file system comprises a first encrypted file directory and the first file directory including a first file and a second file, with the first file directory having a corresponding first encryption/decryption (e/d) key, the first file having a corresponding second e/d key, and the second file having a corresponding third e/d key and wherein the file system is hierarchical and includes a plurality of levels of file directories and includes a master e/d key;
   decrypting of the first file requires at least use of both the first and second e/d keys, and decrypting of the second file requires at least use of both the first and third e/d keys;
   responsive to a key storage condition, storing, in a cache memory, the first e/d key and the second e/d key and the third e/d key;
   receiving a request to read the first file;
   responsive to the request, accessing the first file, with the accessing of the first file including:
   accessing, from the cache memory, the first e/d key;
   decrypting the first file using the first and second e/d keys;
   accessing the decrypted version of the first file;
   encrypting a second file directory by a fourth e/d key, wherein the second file directory is a parent directly of the first file directory;
      decrypting of the first file requires at least use of all of the master e/d key, the first e/d key, the second e/d key and the fourth e/d key; and
   decrypting of the second file requires at least use of all of the master e/d key, the first e/d key, the third e/d key and the fourth e/d key.

2. The computer-implemented method of claim 1 wherein the key storage condition is performance of an access operation on the second file using the first and third e/d keys.

3. The computer-implemented method of claim 1 wherein the access of the first file further includes:
   decrypting the second e/d key using the first e/d key accessed from the cache memory.

4. The computer-implemented method of claim 3 wherein the cache memory is located on a processor that is used to perform decryption operations.

5. The computer-implemented method of claim 3 wherein the cache memory is located in a volatile memory that is separate from a processor that is used to perform decryption operations.

6. The computer-implemented method of claim 1 further comprising: responsive to the key storage condition, storing, in the cache memory, the fourth e/d key;
   wherein the key storage condition is performance of an access operation on the second file using the master e/d key, the first e/d key, the third e/d key and the fourth e/d key.

7. The computer-implemented method of claim 6 further comprising:
   re-encrypting the fourth key by the master key;
   re-encrypting the first key by the master key; and
   re-encrypting the third key by the master key.

8. The computer-implemented method of claim 1 wherein the first e/d key is stored in the cache memory in encrypted form.

9. The computer-implemented method of claim 1 wherein the first e/d key is stored in the cache memory in decrypted form.

10. A non-transitory computer program product for use with an encrypted file system, the computer program product stored on a non-transitory computer readable storage medium having stored thereon:
    program instructions to encrypt a file system wherein the file system comprises a first encrypted file directory and the first file directory including a first file and a second file, with the first file directory having a corresponding first encryption/decryption (e/d) key, the first file having a corresponding second e/d key, and the second file having a corresponding third e/d key and wherein the file system is hierarchical and includes a plurality of levels of file directories and includes a master e/d key;
    program instructions to decrypt of the first file requires at least use of both the first and second e/d keys, and decrypting of the second file requires at least use of both the first and third e/d keys;
    responsive to a key storage condition, program instructions to store, in a cache memory, the first e/d key and the second e/d key and the third e/d key;
    program instructions to receive a request to read the first file;
    responsive to the request, program instructions to access the first file, with the accessing of the first file including:
    program instructions to access, from the cache memory, the first e/d key;
    program instructions to decrypt the first file using the first and second e/d keys; and
    program instructions to access the decrypted version of the first file;
    program instructions to encrypt a second file directory by a fourth e/d key, wherein the second file directory is a parent directly of the first file directory;
    program instructions to decrypt of the first file requires at least use of all of the master e/d key, the first e/d key, the second e/d key and the fourth e/d key; and
    program instructions to decrypt of the second file requires at least use of all of the master e/d key, the first e/d key, the third e/d key and the fourth e/d key.

11. The computer program product of claim 10 wherein the key storage condition is performance of an access operation on the second file using the first and third e/d keys.

12. The computer program product of claim 10 wherein the access of the first file further includes:
    program instructions to decrypt the second e/d key using the first e/d key accessed from the cache memory.

13. A computer system for use with an encrypted file system, the computer system comprising:

a processor(s) set, and
a non-transitory computer readable storage medium,
wherein:
the processor set is structured, located, connected and/or programmed to run program instructions stored on the non-transitory computer readable storage medium; and
the program instructions include:
program instructions to encrypt a file system wherein the file system comprises a first encrypted file directory and the first file directory including a first file and a second file, with the first file directory having a corresponding first encryption/decryption (e/d) key, the first file having a corresponding second e/d key, and the second file having a corresponding third e/d key and wherein the file system is hierarchical and includes a plurality of levels of file directories and includes a master e/d key;
program instructions to decrypt of the first file requires at least use of both the first and second e/d keys, and decrypting of the second file requires at least use of both the first and third e/d keys;
responsive to a key storage condition, program instructions to store, in a cache memory, the first e/d key and the second e/d key and the third e/d key;
program instructions to receive a request to read the first file;
responsive to the request, program instructions to access the first file, with the accessing of the first file including:
program instructions to access, from the cache memory, the first e/d key;
program instructions to decrypt the first file using the first and second e/d keys;
program instructions to access the decrypted version of the first file;
program instructions to encrypt a second file directory by a fourth e/d key, wherein the second file directory is a parent directly of the first file directory;
program instructions to decrypt of the first file requires at least use of all of the master e/d key, the first e/d key, the second e/d key and the fourth e/d key; and
program instructions to decrypt of the second file requires at least use of all of the master e/d key, the first e/d key, the third e/d key and the fourth e/d key.

14. The computer system of claim 13 wherein the key storage condition is performance of an access operation on the second file using the first and third e/d keys.

15. The computer system of claim 13 wherein the access of the first file further includes:
program instructions to decrypt the second e/d key using the first e/d key accessed from the cache memory.

* * * * *